W. A. DEAN.
Corn-Planters.
No. 129,008. Patented July 16, 1872.
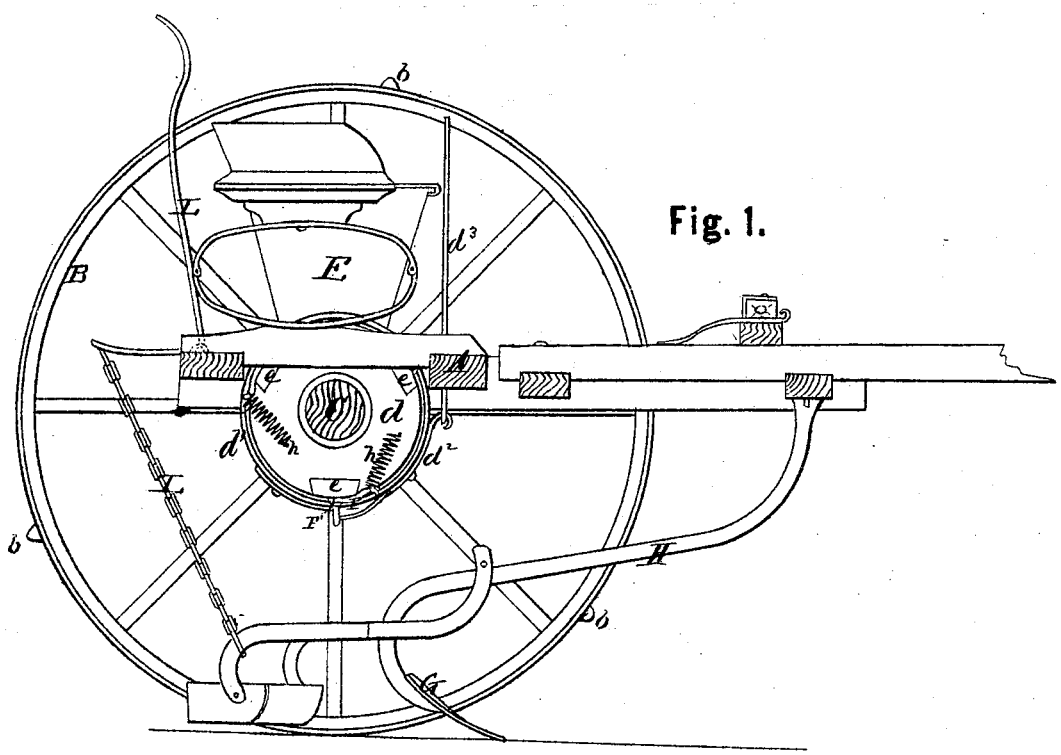
Fig. 1.
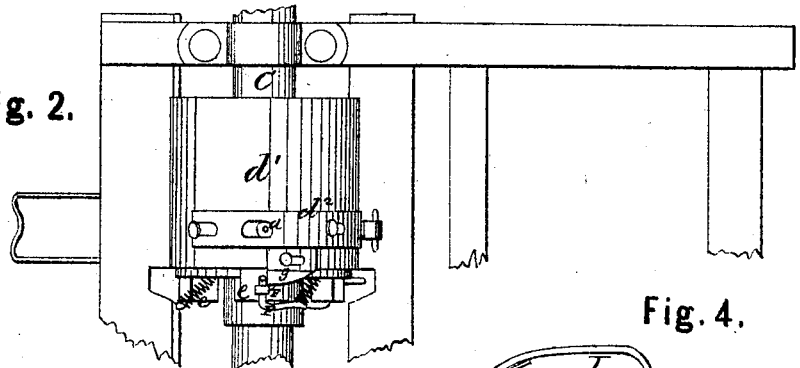
Fig. 2.
Fig. 4.
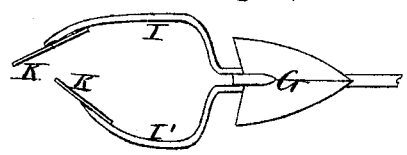
Fig. 3.
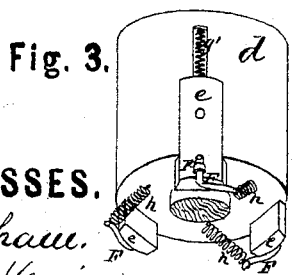
WITNESSES.
J. E. Upham.
Phil C. C. Mast.
INVENTOR.
William A. Dean,
Chipman Hosmer & Co.,
Attys.

UNITED STATES PATENT OFFICE.

WILLIAM A. DEAN, OF NEW LEXINGTON, OHIO.

IMPROVEMENT IN CORN-PLANTERS.

Specification forming part of Letters Patent No. 129,008, dated July 16, 1872.

*To all whom it may concern:*

Be it known that I, WILLIAM A. DEAN, of New Lexington, in the county of Perry and State of Ohio, have invented a new and valuable Improvement in Corn-Planters; and I do hereby declare that the following is a full, clear, and exact description of the construction and operation of the same, reference being had to the annexed drawing making a part of this specification, and to the letters and figures of reference marked thereon.

Figure 1 of the drawing is a representation of a longitudinal vertical section of my invention. Figs. 2, 3, and 4 are detail views of the same.

This invention has relation to corn-planters; and consists in the construction and novel arrangement of the seed-dropping devices, row-markers, and covering scrapers, all substantially as hereinafter described.

In the drawing, A represents a rectangular frame, mounted on wheels B, from the tires of which project teeth $b$, arranged at proper intervals, to act as markers while the implement is moving. C represents the axle, upon which are placed two seeding-cylinders, $d$, encircled by metallic cases $d^1$, and adapted to rotate in connection with the axle and underneath the hoppers E. The seed-cups are in dovetailed slides $e$ fitting longitudinal notches cut in the cylinders $d$ and projecting beyond their inner ends. When the cylinders rotate the seed is taken from the hoppers by the cups, carried around and dropped through openings $a'$ made in the casings $d^1$, as shown. The size of said openings is regulated by curved perforated slides $d^2$, operated by vertical rods $d^3$. F represents bent rods, movably attached to the slides $e$ by staples F'. The inner or short arms of said rods are arranged in a radial manner with respect to the cylinders, and, when the latter rotate, are brought into contact with cam projections $g$ secured to and projecting from the casings $d^1$. By this means the slides are drawn out. Springs $g'$, securing the inner ends of said slides to the seeding-cylinders, serve to draw back the slides to their original positions. Hence, when the cylinders are rapidly rotated, the slides are made to vibrate or shake in such a manner that the seed will be made to fall from the cups through the opening $a$. The cam projections or plates $g$ are secured to the cases $d^1$ by means of pins or adjusting-screws, and are adjustable. When the movement of the cylinders is reversed the rods F come in contact with the abrupt edges of said plates, and are thrown over so as not to be injured. Springs $h$, connecting said rods to the cylinders, throw said rods back to their original positions after the action of the cam-plate. G represents the shovels for forming the furrows. These shovels are attached to beams H, which are hinged to the front part of the frame A and extend back, as shown. The corn is deposited immediately in the rear of said shovels. Attached to the beam H, in the manner shown, are the curved arms I I', diverging from each other at a point below the seed-opening to allow the corn to be properly deposited. These arms are of unequal length, converge at their rear ends, and hold obliquely-arranged covering-plates K, to collect the earth and cover the corn. The coverers and shovels are capable of being raised by means of elbow-levers L, hinged to the frame A and connected to one of the arms I I' by means of chains L'.

What I claim as my invention, and desire to secure by Letters Patent, is—

1. The cylinder $d$, inclosed by the perforated boxes $d^1$ and provided with the cup-slides $e$, adapted to operate through the medium of the rods F, substantially as specified.

2. The springs $h$, in combination with the cylinder $d$, bent rods F, and cam-plate $g$, and slide $e$, as and for the purpose specified.

In testimony that I claim the above I have hereunto subscribed my name in the presence of two witnesses.

WILLIAM A. DEAN.

Witnesses:
D. D. KANE,
GEORGE E. UPHAM.